(12) United States Patent
Wezyk et al.

(10) Patent No.: US 6,557,921 B2
(45) Date of Patent: May 6, 2003

(54) HARDTOP VEHICLE ROOF MOVABLE BETWEEN CLOSED AND OPEN POSITIONS

(75) Inventors: Wojciech Wezyk, Sindelfingen (DE); Thomas Halbweiss, Remseck (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/112,602

(22) Filed: Mar. 16, 2002

(65) Prior Publication Data

US 2002/0149226 A1 Oct. 17, 2002

(30) Foreign Application Priority Data

Mar. 19, 2001 (DE) .......................... 101 13 428

(51) Int. Cl.[7] .................................. B60J 7/00
(52) U.S. Cl. ........................ 296/107.07; 296/107.08; 296/107.17; 296/107.2
(58) Field of Search ................ 296/180.1, 146.14, 296/91, 108, 107.07, 107.08, 107.17, 107.2

(56) References Cited

U.S. PATENT DOCUMENTS

| | | | | |
|---|---|---|---|---|
| 5,265,930 A | * | 11/1993 | Klein et al. ............ | 296/107.17 |
| 5,975,620 A | * | 11/1999 | Jambor et al. ......... | 296/107.17 |
| 6,318,793 B1 | * | 11/2001 | Rapin et al. ........... | 296/107.17 |
| 6,378,930 B1 | * | 4/2002 | Brettmann ............... | 296/180.1 |

FOREIGN PATENT DOCUMENTS

| | | |
|---|---|---|
| DE | 44 45 580 | 12/1995 |
| DE | 296 01 330 | 7/1996 |

* cited by examiner

*Primary Examiner*—D. Glenn Dayoan
*Assistant Examiner*—Jason Morrow
(74) *Attorney, Agent, or Firm*—Klaus J. Bach

(57) ABSTRACT

In a hardtop vehicle roof comprising at least two roof parts which are movable between a closed position, in which the roof covers the interior space of the vehicle and an open position, in which the roof is in storage compartment behind the interior vehicle space, the roof parts are separated from each other along a separation line extending in the longitudinal direction of the vehicle and are fitted, when the roof is open, into the storage compartment behind the interior space in a position transverse to the longitudinal vehicle direction.

9 Claims, 2 Drawing Sheets

HARDTOP VEHICLE ROOF MOVABLE BETWEEN CLOSED AND OPEN POSITIONS

BACKGROUND OF THE INVENTIONS

The invention relates to a hardtop vehicle roof, which is movable between a closed position in which it covers an interior vehicle space and an open cabriolet position in which the roof is folded into a storage compartment behind the vehicle interior space.

DE 44 45 580 C1 discloses a two-part vehicle roof with a front roof part and a rear roof part into which a rear window is integrated. By way of a common operating mechanism the front and the rear roof parts are movable between a closed position in which the vehicle interior is covered and an open cabriolet position in which the two roof parts are deposited in a storage compartment behind the interior vehicle space. The front and rear roof parts as well as the rear window are disposed in the storage compartment on top of one another. Since both roof parts extend essentially over the whole width of the vehicle the storage compartment must be as wide. The storage compartment is part of the trunk so that in the cabriolet configuration the usable, freely available trunk space is substantially reduced in the transverse as well as in the longitudinal direction.

DE 296 01 330 U1 discloses a hardtop vehicle roof wherein, in the cabriolet configuration, the roof parts are to be deposited in a storage compartment behind the vehicle interior. The vehicle roof comprises two roof parts, which are arranged in parallel in a roof opening. The two roof parts are not connected to the vehicle body by a kinematic roof operating mechanism by which they can be moved relative to the vehicle body but are to be inserted manually into the roof opening or to be removed therefrom. An automatic opening and closing is not possible with this vehicle roof. A storage position of the roof parts is not part of DE 296 01 330 U1 and is not disclosed.

It is the object of the present invention to provide a hardtop vehicle roof, which, in a cabriolet configuration of the vehicle in which the hardtop roof is removed, can be stored in the vehicle while requiring only a small storage space.

SUMMARY OF THE INVENTION

In a hardtop vehicle roof comprising at least two roof parts which are movable between a closed position in which roof covers the interior space of the vehicle and an open position in which the roof is disposed in a storage compartment behind the interior vehicle space, the roof parts are separated from each other along a separation line extending in the longitudinal direction of the vehicle and are fitted when the roof is open, into the storage compartment behind the interior space in a position transverse to the longitudinal vehicle direction.

Since the vehicle roof is divided in the longitudinal vehicle direction, it is possible, particularly in connection with vehicles which have a relatively short vehicle interior such as two-seater convertibles, that the roof parts are kept short whereby, in comparison with known convertibles with transversely extending roof parts, the roof parts can be made short enough to be accommodated in a relatively small storage space. Since the width of each roof part is, with the use of two roof parts, generally about half the width of the vehicle the roof parts can be easily accommodated in a relatively small storage space.

It is for example possible to store the roof parts in cabriolet configuration of the vehicle in an orientation different from the orientation they assume when they are disposed on the vehicle top in a closed roof position. The roof parts are disposed in a cabriolet configuration in the storage space one behind the other in the longitudinal vehicle direction. Upon transfer from the closed to the open roof position, the roof parts are rotated by about 90° about a vertical axis inwardly in order to assume the position in which they are disposed behind one another. In this position, the two-roof parts are preferably disposed directly adjacent one another without any roof components disposed therebetween. In an open-roof position, the roof parts are arranged in this case transverse to the longitudinal vehicle axis behind the interior space of the vehicle and preferably in an upright position in which the roof parts are oriented essentially vertically. This position can be obtained by an additional pivoting of the roof parts about a transverse axis wherein preferably a combination of the two pivot movements about spatial pivot axes is executed.

With a transverse orientation of the roof parts in an upright position, the roof parts can be accommodated in a storage compartment which is only very short in the longitudinal vehicle direction so that the storage compartment is relatively narrow and needs only a small opening for the insertion of the roof parts. This has the advantage that no additional operating mechanism is needed for a rear cover as it is for a large storage compartment opening.

For the transfer into the open roof position, the roof parts may be moved rearwardly by a translatory movement in addition to being pivoted.

The vehicle roof includes expediently a rear window panel which, in the closed position of the roof, is at least partially surrounded by the roof parts and which is releasably received in an opening formed by the roof parts. For a particularly compact storage position of the roof parts, the opening can be utilized in the storage position of the roof parts to accommodate wheel wells of the vehicle which may protrude into the storage compartment so that the limited space available for the deposition of the vehicle roof is optimally utilized.

Preferably the roof parts surround the rear window along the side edges and the top edge of the rear window wherein the section of each roof part engaging a side edge of the window forms, at the same time, the C-pillar of the vehicle roof.

The rear window includes preferably its own operating mechanism which is independent of the roof parts or respectively, the operating mechanism for the roof parts and by way of which the rear window is directly coupled to the vehicle body. The rear window operating mechanism preferably provides for a lowering of the rear window into the storage compartment in order to avoid a collision with the roof parts during their transfer from their closed to the storage position. The independent arrangement of the rear window operating mechanism also makes it possible to use the rear window as a wind deflector when the vehicle roof is in the storage compartment, by raising the window to a position in which it extends above the vehicle contour directly behind the vehicle seats. The rear window takes on a double function as a window when the vehicle roof is closed and a wind deflector in a cabriolet configuration wherein the roof is removed from the vehicle top. No additional wind deflector component is needed in this case.

The invention will become more readily apparent from the following description thereof on the basis of the accompanying drawings.

DESCRIPTION OF A PREFERRED EMBODIMENT

Figure 1:
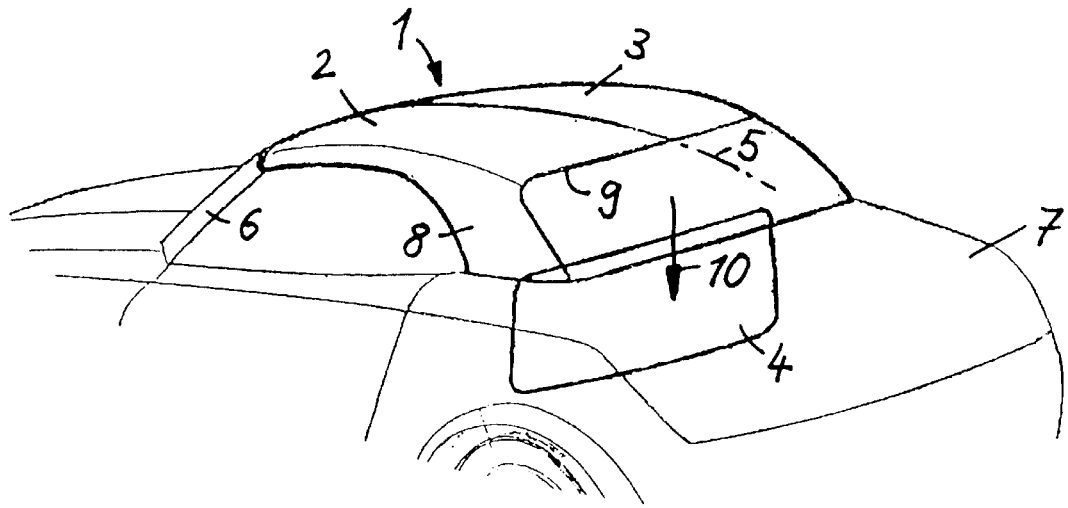
FIG. 1 shows a convertible vehicle with a longitudinally divided hardtop vehicle roof shown in a closed position and with its rear window lowered.

In the figures, identical components are designated by the same reference numerals.

The hardtop roof 1 as shown in FIG. 1 is divided longitudinally and consists of two rigid roof parts 2 and 3, which, in a closed position, extend along a longitudinal separating line 5 that extends essentially parallel to the longitudinal vehicle axis and is disposed in a common vertical plane. The separating line 5 is preferably disposed in the longitudinal center plane of the vehicle and the roof parts 2 and 3 are mirror symmetric to the longitudinal separating line 5. In the area of the separating line 5, the roof parts 2 and 3 are joined in the transverse direction in a wind- and water-tight manner. For joining the two roof parts 2 and 3, a clamping structure or a similar component may be provided whereby a good sealing effect is achieved. Each of the roof parts 2 and 3 extends in the longitudinal vehicle direction essentially over the complete interior vehicle space between the windshield frame 6 and a rear lid 7 which covers a rear trunk. Each roof part 2 or 3 is a one-piece component and comprises a rear side portion which forms a C-pillar 8 when the roof is closed.

The hardtop vehicle roof 1 comprises a rear window 4 which, when closed, is received in an opening 9 in the rear area of the roof parts 2 and 3. The openings 9 in the roof parts 2 and 3 together have an overall dimension corresponding to the dimensions of the rear window 4. In the closed position of the rear window 4, its side edges are in contact with the respective C-pillars 8 of the roof parts 2 and 3 and its top edge is in contact with the transversely extending rear edges of the roof parts 2 and 3, which delimit the opening 9.

The rear window can be moved out of the opening 9 in the roof parts 2 and 3 and can be lowered in the direction of the arrow 10 into a storage compartment 18 (see FIGS. 3 and 4), in order to provide space for the transfer of the roof parts 2 and 3 from the closed position to a storage position or vice versa. For this purpose, the rear window 4 includes its own operating mechanism, by way of which the rear window 9 is coupled to the vehicle body so that it can be lowered and raised independently of any roof operating mechanism. The rear window can expediently be moved between the closed position, in which it is received in the opening 9 in the roof parts 2 and 3 and its open position, in which it is lowered into the storage compartment without opening of the trunk lid 7.

Figure 2:
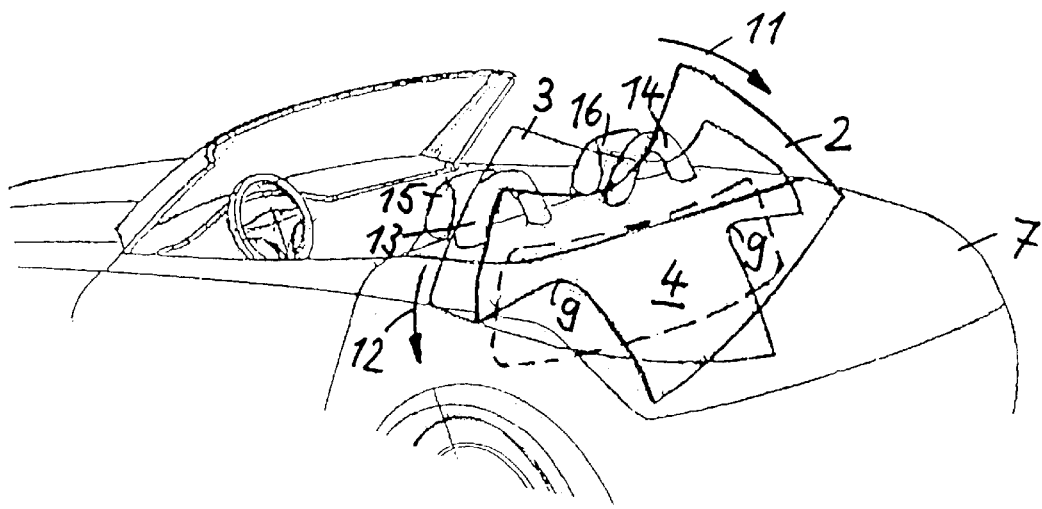
FIG. 2 shows the vehicle roof in an intermediate position between the closed and the open, that is, in the cabriolet position.

FIG. 2 shows an intermediate position of the vehicle roof during the transfer from the closed to open position that is, the cabriolet configuration of the vehicle. The two roof parts 2 and 3 are moved backwardly toward the rear storage compartment by the operating mechanism provided therefor. In this procedure, the roof parts 2 and 3 are pivoted about a spatial axis which is composed of two individual pivot movements one about an axis extending transverse to the longitudinal vehicle direction and the other about a vertical axis wherein both pivot movement individually extend over about 90°. The spatial rotation provided by the individual pivot movement of the roof parts 2 and 3 is indicated in FIG. 2 by the arrows 11 and 12. As a result of this spatial rotation, the roof parts 2 and 3 are disposed in the storage compartment in an upright position and directly behind each other. During the transfer movement of the roof parts 2 and 3 into the storage or, respectively, the cabriolet position the rear window 4 remains lowered into the storage compartment. The roof parts 2 and 3 are deposited directly behind the rear window. The transfer of the roof parts 2 and 3 into the storage compartment may occur with the trunk lid closed. The storage compartment is arranged directly behind the rollover bars 13 and, respectively, 14 provided for the respective driver and passenger seats 15 and 16 in front of the trunk of the vehicle.

Figure 3:
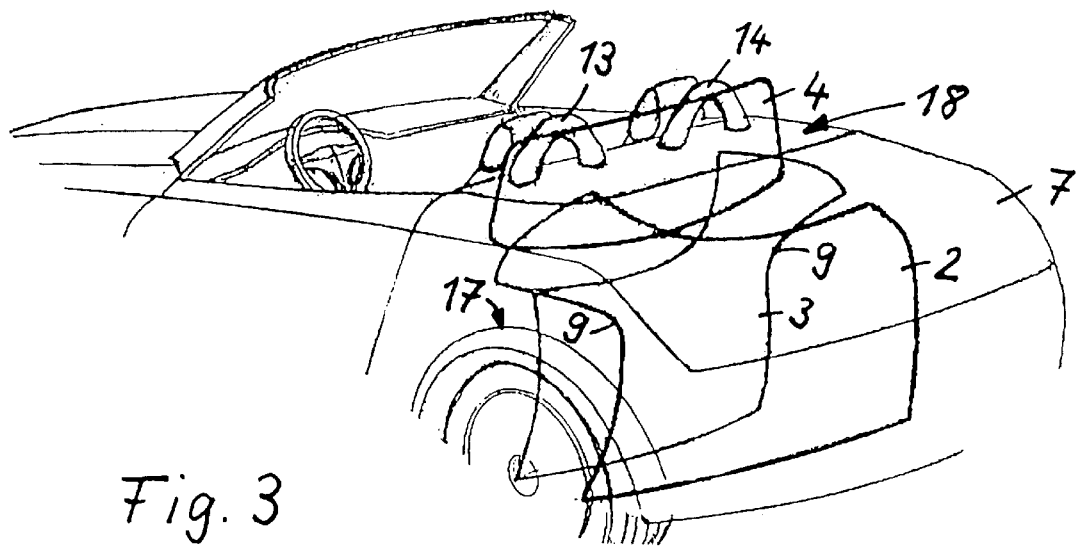
FIG. 3 shows the vehicle roof in a cabriolet position with the rear window raised so as to assume the function of a wind deflector.

FIG. 3 shows the vehicle in cabriolet configuration wherein the roof parts 2 and 3 are deposited in the storage compartment 18 arranged between the trunk which is closed by a trunk lid 7 and the roll-over bars 13 and 14 and acts as a wind deflector. The roof parts 2 and 3 are deposited completely in the storage compartment 18 and are disposed below the vehicle body contour. As a result of the spatial pivot movement described with reference to FIG. 2 during the transition from the closed position of the vehicle roof to the storage position, the openings 9 in each roof part 2 and, respectively, 3 are disposed in the areas of the wheel wells 17, which extend into the storage compartment. In this way, the roof parts 2 and 3 extend over the wheel wells 17 at opposite sides of the vehicles in a space-saving manner.

The movement of the roof parts 2 and 3 during the transfer from the closed to the storage position occurs in mirror-reversed symmetrical manner with respect to the longitudinal center axis of the vehicle so that, in the storage position in the storage compartment 18, the opening 9 of each roof part 2 or 3 accommodates the respective associated wheel well 17 and the respective roof portion extends over the wheel well.

Figure 4:
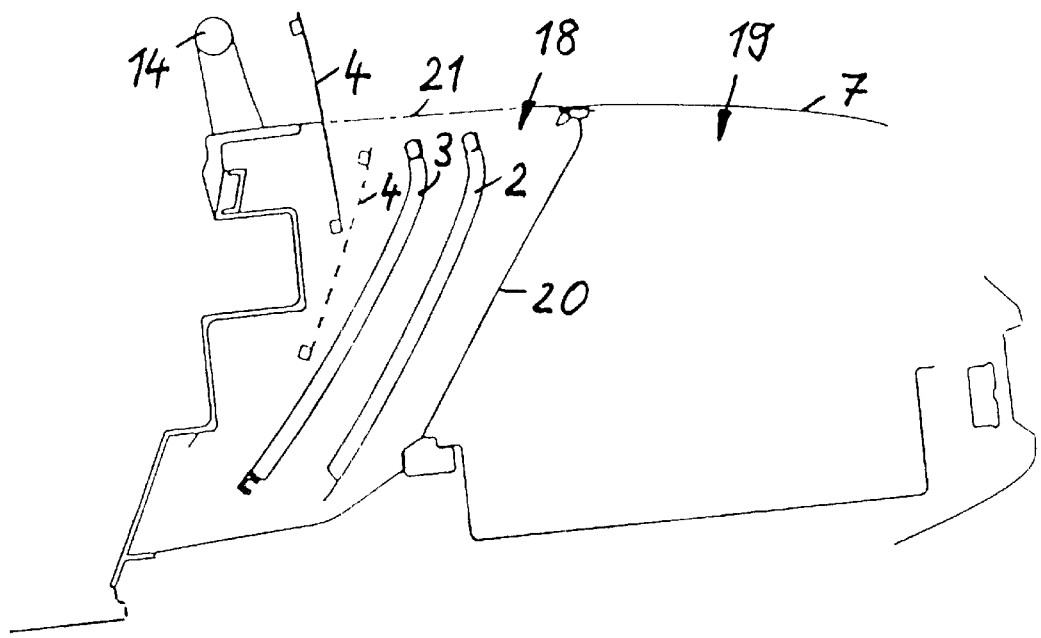
FIG. 4 is a cross-sectional view through the storage compartment of the vehicle in a cabriolet configuration of the vehicle, in which the hardtop vehicle roof is disposed in the storage compartment and the rear window is raised.

FIG. 4 shows that the storage compartment 18 is separated from the trunk 19 by a separation panel 20 which can be removed when the roof is closed or which can be pivoted into an opening position in order to increase the usable trunk volume. The storage space 18 may be covered by a tarpaulin if desired.

The rear window 4 is movable between a lowered position in which it is disposed in the storage compartment as indicated in FIG. 4 by a dashed line and a raised position as indicated by a solid line, in which the rear window assumes the function of a wind deflector. The movement of the rear window between the lowered and the raised positions is accomplished by a rear window operating mechanism, which is independent from an operating mechanism for the roof parts 2 and 3. In its lowered position, the rear window 4 is disposed adjacent the roof parts 3 and 2 when these parts are disposed in the storage compartment.

In the cabriolet configuration of the vehicle when the vehicle roof is in the storage compartment, the rear window 4 can be raised into a wind deflector position. However, it may at times be desirable to lower the rear window into the storage space when the roof is removed.

It may also be expedient to provide more than two longitudinally separated roof parts. Furthermore, each roof part may extend in the longitudinal vehicle direction only over part of the full roof length.

What is claimed is:

1. A hardtop vehicle roof for a vehicle having an interior space, a storage compartment for the vehicle roof and a rear trunk, said vehicle roof comprising at least two roof parts movable between a closed position in which said roof covers said interior space and an open, storage position in which said roof is deposited in said storage compartment behind said interior space, said roof parts being separated from each other along a longitudinally extending separation line and being fitted, in the open position of the roof, into said storage compartment behind said interior space in a position transverse to the longitudinal vehicle direction.

2. A hardtop vehicle roof according to claim 1, wherein in said closed position each vehicle roof part extends in the longitudinal vehicle direction over the whole vehicle interior space.

3. A hardtop vehicle roof according to claim 1, wherein said roof parts have rear cutouts, which in said closed position thereof jointly form a window opening into which a rear window is removably fitted.

4. A hardtop vehicle roof according to claim 3, wherein in said closed position each of said roof parts engages said window along a top edge portion and one side edge of said window.

5. A hardtop vehicle roof according to claim 4, wherein each roof part has a side section extending along a side edge of said window and forming a C pillar of said vehicle roof.

6. A hardtop vehicle roof according to claim 3, wherein said roof parts, when disposed in said storage compartment, are so arranged that wheel wells of said vehicle protruding from opposite sides into said storage compartment are accommodated by the cutouts in said vehicle roof parts.

7. A hardtop vehicle roof according to claim 3, wherein said rear window is supported so as to be movable independently of said roof parts.

8. A hardtop vehicle roof according to claim 7, wherein said window is movable to a raised position behind said interior space so as to serve in said raised position as a wind deflector when said roof parts are deposited in said storage compartment and said vehicle is in a cabriolet configuration.

9. A hardtop vehicle roof according to claim 8, wherein, for the transfer of said roof parts between said closed and said storage positions, said window is movable into a lowered position.

* * * * *